United States Patent [19]
Blust et al.

[11] Patent Number: 5,544,227
[45] Date of Patent: Aug. 6, 1996

[54] RADIOTELEPHONE COMMUNICATIONS SYSTEM WITH DIRECT ACCESS TO INTEROFFICE TELEPHONE TRUNK CIRCUITS AND INTERFACE THEREFOR

[75] Inventors: Stephen M. Blust, Lawrenceville; Edward I. Comer, Marietta; Jere T. Sandidge, Stone Mountain, all of Ga.

[73] Assignee: BellSouth Corporation, Atlanta, Ga.

[21] Appl. No.: 474,522

[22] Filed: Jun. 7, 1995

Related U.S. Application Data

[63] Continuation of Ser. No. 114,648, Aug. 31, 1993, abandoned.

[51] Int. Cl.⁶ .................................................. H04Q 7/26
[52] U.S. Cl. .................................... 379/63; 379/58
[58] Field of Search ..................... 379/58, 59, 60, 379/63; 455/33.1, 54.1, 56.1, 33.2, 54.2, 11.1, 15, 17

[56] References Cited

U.S. PATENT DOCUMENTS

| | | | |
|---|---|---|---|
| 4,768,218 | 8/1988 | Yorita | 379/63 |
| 4,890,315 | 12/1989 | Berdixer et al. | 379/58 X |
| 4,922,517 | 5/1990 | West, Jr. et al. | 379/58 |
| 5,001,742 | 3/1991 | Wang | 379/60 |
| 5,315,637 | 5/1994 | Bresden et al. | 379/63 |

*Primary Examiner*—Curtis Kuntz
*Assistant Examiner*—William G. Trost
*Attorney, Agent, or Firm*—Robin, Blecker, Daley & Driscoll

[57] ABSTRACT

An interface circuit for use with a radiotelephone communications system in which the interface circuit is adapted to interface a trunk circuit serving a telephone switching system with a radiotelephone of the system using the trunk circuit supervision and signaling so that the switching system and trunk circuit have direct access to the radiotelephone system.

10 Claims, 10 Drawing Sheets

RADIOTELEPHONE COMMUNICATIONS SYSTEM WITH DIRECT ACCESS TO INTEROFFICE TELEPHONE TRUNK CIRCUITS AND INTERFACE THEREFOR

This is a continuation application under 37 CFR 1.62 of prior application Ser. No. 08/114,648, filed Aug. 31, 1993, now abandoned.

BACKGROUND OF THE INVENTION

This invention relates to mobile radiotelephone communications systems and, in particular, to systems of this type adapted to interface with standard telephone equipment.

In present day mobile radiotelephone communications systems, subscribers to a system utilize radiotelephones provided with radiotelephone transceivers to transmit and receive radio signals carrying calls from and to the subscribers. These calls are coupled through base stations which serve their respective coverage area of the radiotelephone system.

The radiotelephone system also includes a radiotelephone switching system referred to as a mobile telephone switching office (MTSO) or a mobile switching center (MSC) which radio communicates with and provides selective interconnection of calls to and from the base stations. The MTSO is additionally linked via lines or trunk circuits to the standard public or private switched telephone network (PSTN). As a result, subscribers of the mobile system using their radiotelephones can communicate with subscribers on the PSTN using their standard telephone stations, i.e., dial pulse or dual tone multi-frequency (DTMF) stations.

In a system of this type, a call from a subscriber on the radiotelephone system to a subscriber on the PSTN is routed from the radiotelephone of the calling subscriber to a base station. The radio base station then communicates the call to the MTSO which directs the call to the PSTN. The latter network then carries the call to the called subscriber.

The reverse process occurs when a subscriber on the PSTN places a call to a called subscriber on the radiotelephone system. In this case, the call from the calling subscriber is conveyed to the PSTN which relays the call to the MTSO. The latter office then passes the call to the appropriate base station which then communicates the call to the radiotelephone of the called subscriber. The MTSO thus has the following two points of interface: (1) inter-office trunks that interface to the public switched telephone network; and (2) base stations which interface with the radiotelephones used to provide the radio signal connections.

As can be appreciated, with the aforesaid system, subscribers using standard telephone stations and standard telephone equipment can only access the radiotelephone system through the PSTN in order for a call to be completed. However, in certain circumstances, it may be desirable for such subscribers to be able to gain direct access to the radiotelephone system. Direct access to the radiotelephone system might be beneficial where there is a need to provide back-up protection against disruption of the PSTN, or in areas where the PSTN has not as yet been made available.

U.S. Pat. No. 4,922,517 discloses one technique for allowing this direct access. In the '517 patent, an interface circuit provides an interface between a standard two-wire dial pulse or DTMF telephone station and a radiotelephone transceiver. The interface circuit of the '517 patent simulates to the telephone station the standard two-wire line or loop circuit used in the telephone switching system of the PSTN.

In the PSTN, the standard two-wire line circuit and its associated telephone station correspond to a specific directory or telephone number on a one-to-one basis. A call originating or terminating at the telephone station having this directory number will thus be handled by the associated line circuit of the telephone switching system.

When a call is terminated at a telephone station, the telephone switching system via the line circuit signals the telephone station of the incoming call by applying an alternating current ringing signal to the line circuit. This signal rings the bell typically found within the telephone station. On the other hand, when a call is originated at the telephone station, the telephone switching system supplies to the telephone station via the line circuit "dial tone" audio to signal the telephone station to forward routing information (i.e., the directory or telephone number being called). This information is forwarded using DTMF tones or dial pulse signaling, i.e., interruptions in the loop current, depending upon the telephone station type, i.e., DTMF or dial pulse.

A telephone station originating a call signals the call origination to the telephone switching system by going off-hook. This results in an electrical continuity or discontinuity condition in the line circuit. The telephone switching system detects this condition by the presence or absence of current flow and initiates return dial tone audio as above-mentioned.

The above interactions between a standard telephone station and a standard telephone line circuit of a telephone switching system include both supervision for call origination and termination and signaling for alerting users and for transfer of routing information. Supervision and signaling for a line circuit can be summarized from the above as follows: supervision is provided by the presence and/or absence of line current (typically loop start signaling or ground-start signaling); signaling is provided to the telephone switching system for terminating calls by alternating current ringing signals; start dial signaling is provided by the switching system to the telephone station for originating calls by dial tone audio; answer supervision is provided by the switching system to the telephone station for terminating calls by removal of the alternating current ringing signals; and signaling is provided by the telephone station to the switching system for routing information by dial pulse or DTMF signals.

As above-indicated, the interface circuit of the '517 patent enables direct access to a cellular system only via the above-discussed standard telephone line circuit. However, this limits the usefulness of the interface, since it cannot be used with standard telephone interoffice telecommunications facilities.

A standard interoffice telecommunications facility is normally not associated with a specific telephone station or telephone number. Instead, such a facility is shared by numerous telephone numbers and telephone stations on an availability basis. Accordingly, the telecommunications facility is customarily referred to as a "trunk circuit", since it sequentially aggregates telephone calls between discrete telephone switching systems, involving the telephony communications of numerous originating and terminating directory or telephone numbers.

Once a telephone switching system has received from a telephone station routing information (i.e., a directory or telephone number) over a standard telephone line circuit, it may be necessary to pass the call to another telephone switching system in order for the call to reach its ultimate and correct destination. If this is the case, the originating-end switching system will typically seize an idle trunk circuit serving the two switching systems.

When a trunk circuit is seized at the originating-end switching system, seizure is communicated to the receiving-end switching system. This occurs generally using E&M "out of band signaling" and supervision established for the trunk circuit at the originating-end switching system or via labeled messages in the Common Channel Signaling (CCS) system, Signaling System 7 (SS7), Integrated Services Digital Network (ISDN) or similar communication facility. The receiving-end switching system will also establish similar signaling and supervision for the trunk circuit to advise the originating-end switching system when to forward any routing information. The same trunk circuit sequence is used regardless of which direction the call delivery is to take and is at a system to system (machine-to-machine) communication level. This is unlike the standard telephone line circuit signaling and supervision which is primarily intended for machine to human interaction.

For trunk circuits, the above-discussed supervision and signaling can be summarized as follows: supervision is provided by E&M lead signaling, loop reverse battery signaling (RV-O, RV-T), duplex signaling (DX), single frequency signaling (SF), digital multiplexed signaling or labeled messages; signaling is through multi-frequency R1 (MF), multi-frequency R2 (MF-R2), DTMF, dial pulse or labeled messages; start dial signaling from the switching system is via a temporary supervision state change (referred to as a "wink") or labeled messages; and answer supervision from the switching system is provided by a supervision state change or labeled messages.

As above-noted, present day telephone system equipment can only provide direct access to a radiotelephone system via a standard telephone line circuit. It would be desirable, however, to also be able to provide direct access through a standard trunk circuit connected to a telephone switching system.

It is, therefore, an object of the present invention to provide an interface circuit for permitting a standard telephone trunk circuit to directly access a radiotelephone communications system.

It is a further object of the present invention to provide an interface circuit which interfaces a standard telephone trunk circuit with a transceiver of a radiotelephone of a radiotelephone communications system.

It is yet a further object of the present invention to provide a radiotelephone communications system adapted to utilize an interface circuit meeting the above-stated objectives.

It is still a further object of the present invention to provide a routing correlator in a radiotelephone communications system meeting the above-stated objective which cooperates with the MTSO or MSC of the radiotelephone system to route calls to the radiotelephone, interface and interfaced trunk circuit of the system.

SUMMARY OF THE INVENTION

In accordance with the principles of the present invention, the above and other objectives are realized in an interface circuit adapted to interface a radiotelephone and a telephone trunk circuit using the supervision and signaling used with the telephone trunk circuit and a telephone switching system. The interface circuit includes means adapted to interact with the supervision of the telephone trunk circuit for interfacing this supervision with the radiotelephone to provide call originations and terminations. The interface circuit also includes means adapted to interact with the signaling of the telephone trunk circuit and for interfacing this signaling with the radiotelephone to provide for transfer of routing information. The interface circuit additionally is provided with a means adapted to interact with a routing correlator to provide routing information.

In the embodiment of the invention to be disclosed hereinafter, the interface circuit is used in a cellular-type radiotelephone communications system linked to a PSTN, but is applicable as well to other types of radiotelephone systems. A routing correlator (RC) is provided in the cellular-type radiotelephone communications system and cooperates with the MTSO of the cellular system to route calls to the radiotelephone, interface and interfaced trunk circuit.

BRIEF DESCRIPTION OF THE DRAWINGS

The above and other features and aspects of the present invention will become more apparent upon reading the following detailed description in conjunction with accompanying drawings, in which.

DETAILED DESCRIPTION

Figure 1:
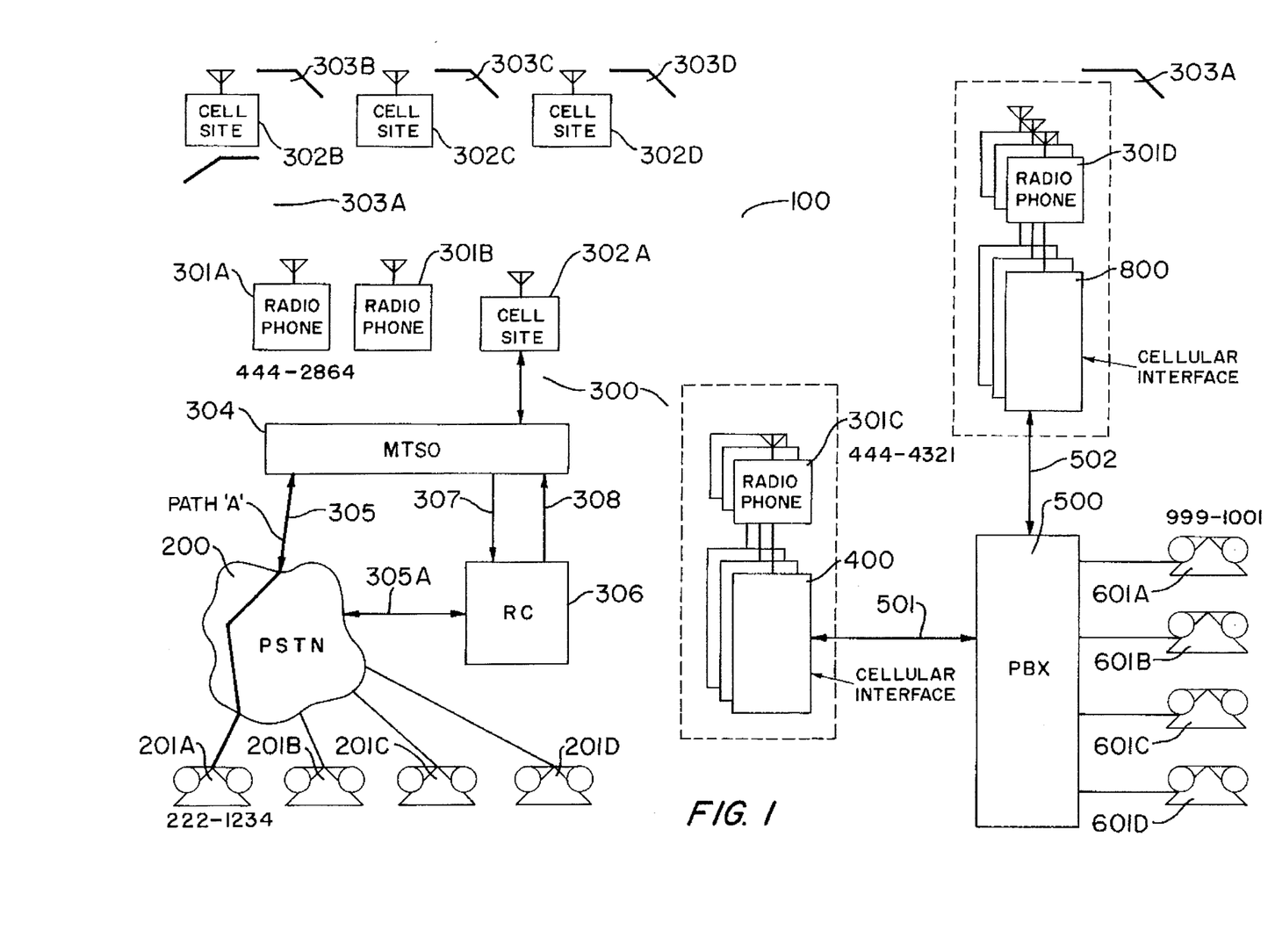
FIGS. 1–4 show various stages of incoming call progress through a telephone system including a cellular-type radiotelephone communications system having an interface circuit for interfacing a radiotelephone with a telephone trunk circuit in accordance with the principles of the invention.

FIG. 1 shows a telephone system 100 in accordance with the principles of the present invention. The system 100 comprises a public switched telephone network (PSTN) 200 and a cellular-type radiotelephone communications system 300.

The PSTN 200 serves subscriber telephone stations 201A, 201B, 201C, 201D . . . Each subscriber telephone station can be a dial pulse or DTMF station and each is identified by routing information in the form of a directory or routing number RN. Only the routing number 222-1234 for the station 201A is shown in the drawings.

The cellular system 300 serves subscriber radiotelephones 301A, 301B, 301C, 301D . . . Each of the radiotelephones can be a standard radiotelephone also identified by a routing number RN. In the present case, the routing number 444-2864 and the routing number 444-4321 for the radiotelephones 301A and 301C are shown in the drawings.

The cellular system also includes base stations or cell sites 302A, 302B, 302C, 302D . . . These base stations are associated with the cells 303A, 303B, 303C, 303D . . . of the cellular system and radiocommunicate with the radiotelephones within their respective cells. In the present case, it is assumed that radiotelephones 301A, 301B, 301C and 301D are presently in the cell 303A and thus radiocommunicate with the base station 302A.

A mobile telephone switching office (MSTO) 304 is also included in the cellular system 300 and provides selective linking or interconnection amongst the base stations 302A, 302B, 302C, 302D . . . for calls to and from the radiotelephones 301A, 301B, 301C, 301D . . . A trunk circuit 305 links the PSTN 200 to the MTSO 304 so that calls can be effected between the subscriber telephone stations 201A, 201B, 201C, 201D . . . and the radiotelephones 301A, 301B, 301C, 301D . . .

A call from a telephone station 201A, 201B, 201C, 201D . . . incoming to a radiotelephone 301A, 301B, 301C, 301D . . . is established by the subscriber at the telephone station dialing the routing number RN of the called radiotelephone. From the dialed routing number RN, the switching network 200 recognizes that the call is for a radiotelephone of the cellular system 300 and directs the call over the trunk circuit 305 to the MTSO 304.

The MSTO 304 in conventional fashion then "pages" the radiotelephone having the dialed routing number RN through appropriate cells as determined by the programming and algorithms governing operation of the MTSO. The radiotelephone responds to the page via the base station currently serving the raditotelephone, thereby identifying this base station to the MTSO. The MTSO 304 thereupon relays the call to the identified base station. The base station, in turn, from the routing number RN then radiotransmits the call so that it can be received by the called radiotelephone, to thereby complete the call.

For outgoing calls from a radiotelephone 301A, 301B, 301C, 301D . . . to a telephone station 201A, 201B, 201C, 201D . . . the call progress reverses. At the radiotelephone, the subscriber places the call by dialing the routing number RN of the telephone station. The call and dialed routing number RN are then radiotransmitted by the radiotelephone to the base station serving the radiotelephone. The base station then relays the call and dialed routing number RN to the MTSO 304.

From the dialed routing number RN, the MTSO 304 recognizes that the call is for a telephone station on the PSTN 200 and directs the call and dialed routing number RN over the trunk circuit 305 to the network. The network 200, using the dialed routing number RN, then conveys the call to the called telephone station to complete the call.

As described to this point, the telephone system 100 is standard in nature. However, in accordance with the principles of the present invention, the system 100 is further adapted to provide added flexibility to the system. In particular, the system 100 is adapted to permit direct access to its cellular system 300 via a standard telephone switching system, e.g., a Private Exchange or PBX (defined as a customer premises telephone switching system), a private or public central office or CO (defined as a local telephone switching system that connects lines and trunks), a private or public access tandem switch or a MTSO, over standard trunk circuits used by such switching system.

This is accomplished, in accordance with the invention, by including in the system 100, one or more interface circuits each for interfacing a radiotelephone of the cellular system 300 with a standard trunk circuit of a telephone switching system. Each interface circuit interfaces the standard supervision used with its associated trunk circuit with the corresponding radiotelephone for effecting call originations and terminations and further interfaces the standard signaling used with such trunk circuit with the radiotelephone for effecting transfer of routing information.

FIGS. 1–9 show two such interfaces 400 and 800 for interfacing the radiotelephones 301C and 301D to trunk circuits 501 and 502 serving a telephone switching system 500. The telephone switching system 500 is shown as a PBX, but the system 500 can be any other type of standard switching system, e.g., a private or public CO, a private or public access tandem switch, a MTSO, etc. Also, the switching system 500 is shown as separate from the PSTN 200. However, the system 500 can be included in the latter network or be part of another switching network.

The switching system 500 serves standard telephone stations 601A, 601B, 601C, 601D . . . These stations can be dial pulse or DTMF stations and communicate with the system 500 in usual fashion. Each of the stations 601A, 601B, 601C, 601D . . . also has a routing number RN which identifies the station in the system 100. Only the routing number 999-1001 for the telephone station 601A is shown in the drawings.

The trunk circuits 501 and 502 can likewise be any type of standard telephone trunk circuit. Thus, for example, each trunk circuit can be any standard trunk circuit using any of the conventional types of supervision, i.e., E&M, loop reverse battery, duplex, single frequency, digital multiplexed or labeled messages, and any of the conventional signaling, i.e., multi-frequency R1, multi-frequency R2, DTMF, dial pulse or labeled messages. Depending upon the particular trunk circuit used, each interface circuit will interface the supervision and signaling of the trunk circuit with the associated radiotelephone so that call originations and terminations can be effected and routing information transferred.

Figure 8:
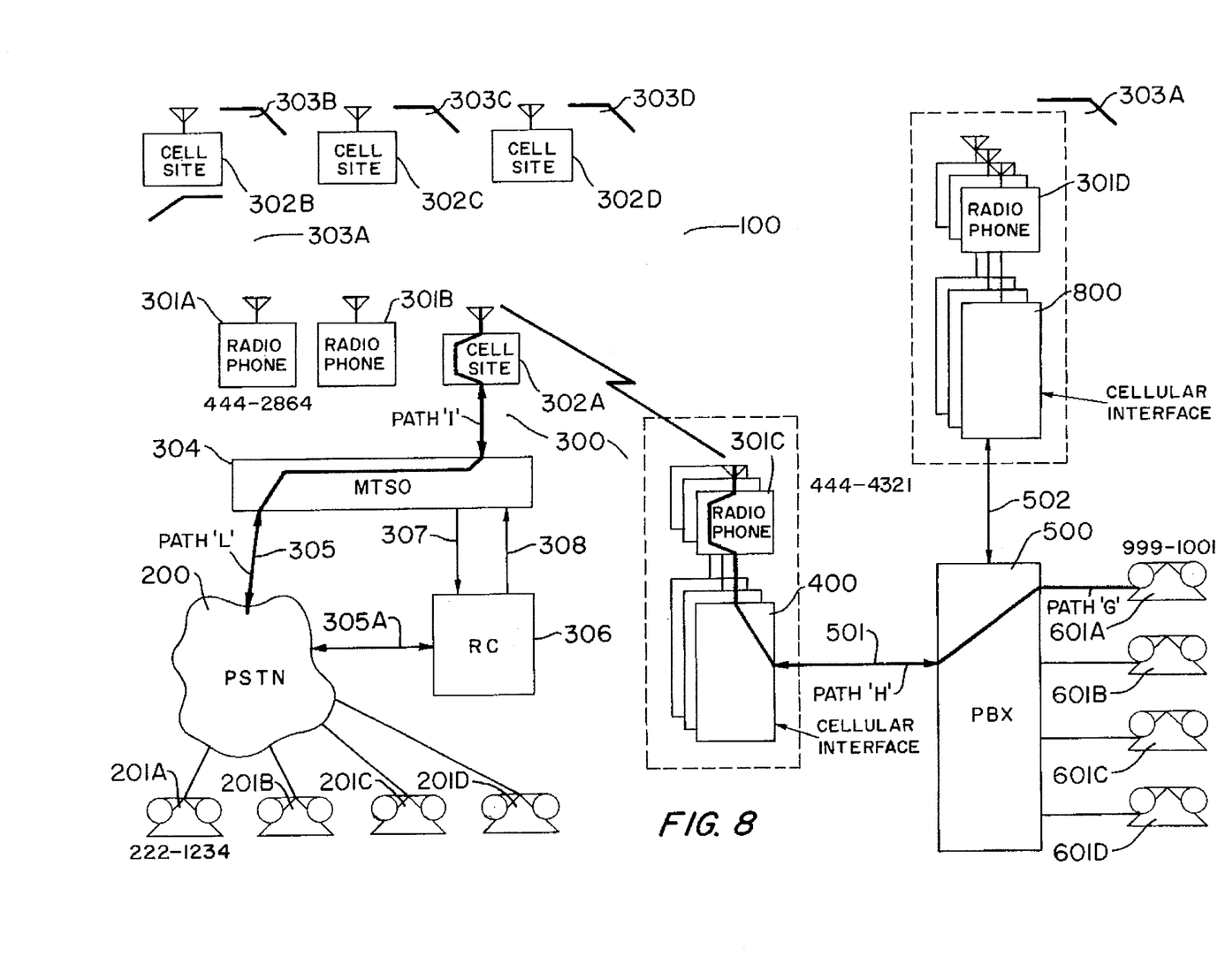
Figure 9:
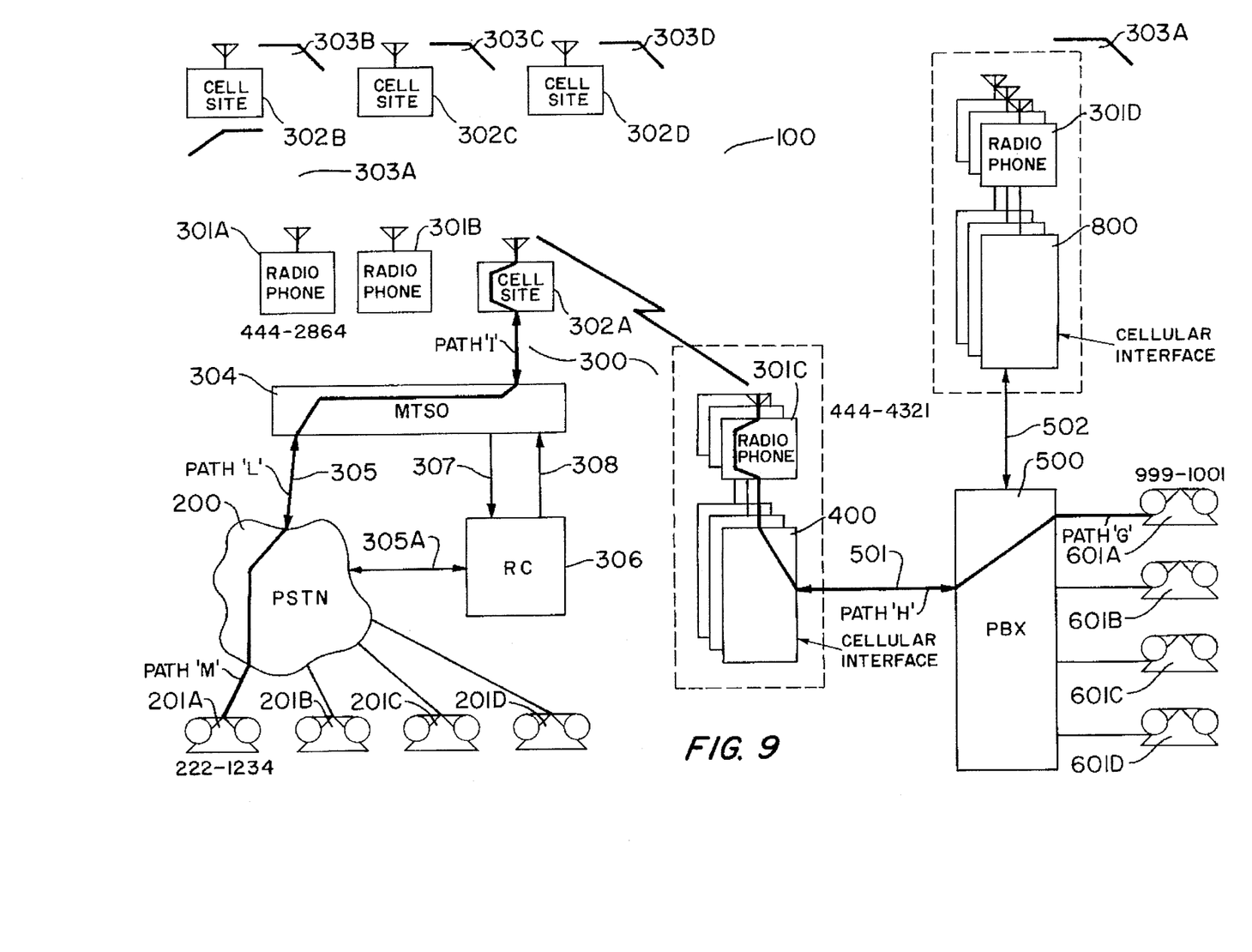
Figure 10:
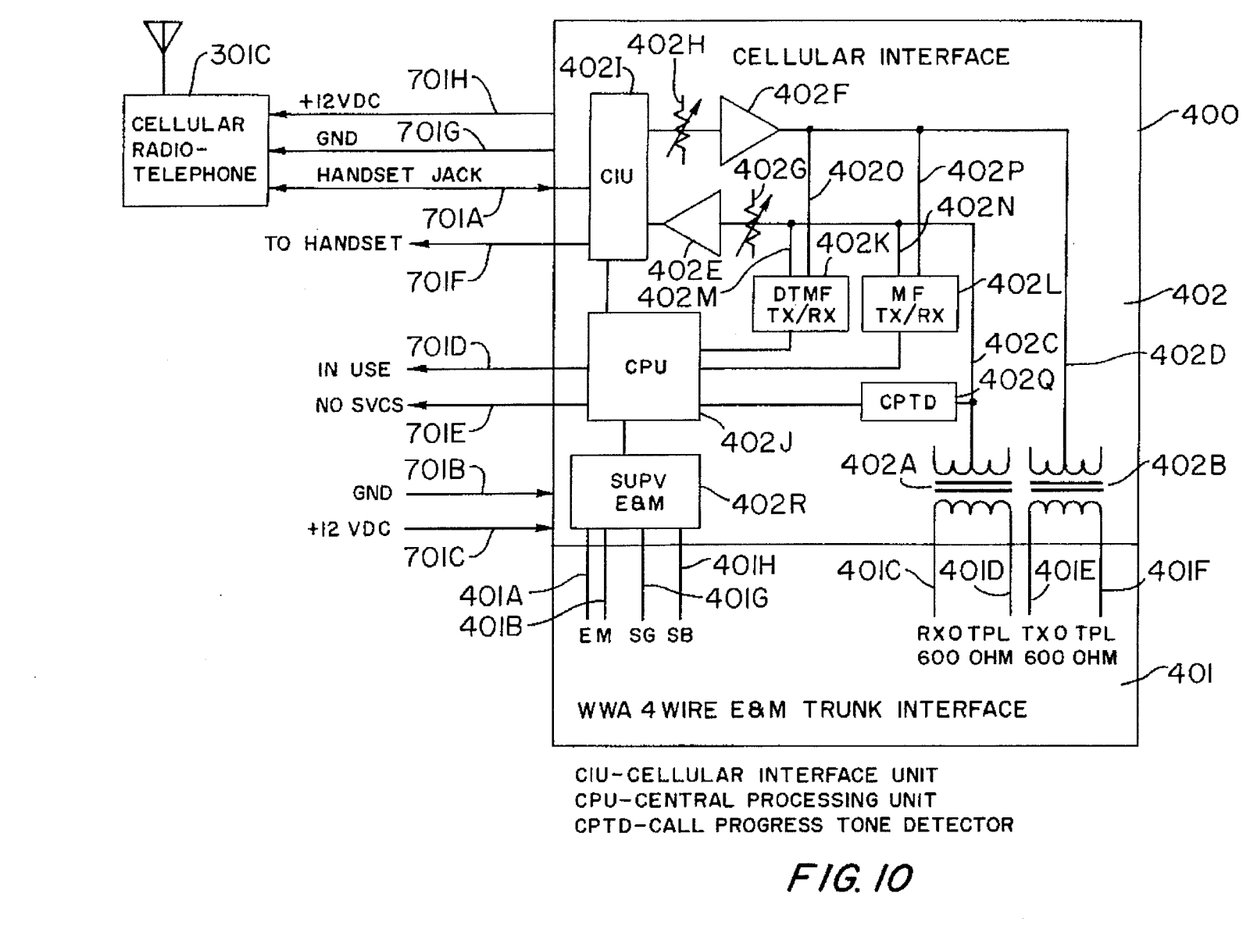
FIG. 10 illustrates in greater detail one form of a circuit usable for the interface circuit shown in FIGS. 1–9.

FIG. 10 illustrates a detailed block diagram of the circuit 400 of FIGS. 1–9. The interface circuit 800 can be of similar construction. As shown, the interface is comprised of discrete components. However, the interface could also be realized using program or software controlled readily available Digital Signal Processors (DSPS). Furthermore, the interface is illustrated as using analog components, but digital components could be used as well.

As shown, the trunk interface circuit 400 includes a trunk interface section 401 and a radiotelephone interface section 402. The section 401 is configured to interface with a standard four-wire trunk circuit using E&M supervision. The section 401 includes E and M lines 401A, 401B, two-wire receive lines 401C, 401D and two-wire transmit lines 401E, 401F. The section also includes signal ground and signal battery lines 401G, 401H. The aforesaid eight lines correspond to those in the standard four-wire E&M trunk circuit and would be interconnected to the trunk circuit by plugging into and/or interconnecting with the corresponding trunk lines.

The radiotelephone interface section 402 of the interface 400 includes transmit and receive transformers 402A and 402B for coupling with the two-wire receive lines 401C and 401D and the two-wire transmit lines 401E and 401F. Tap lines 402C and 402D connect to the transformers 402A and 402B and to transmit amplifier 402E and receive amplifier 402F, respectively. A variable resistor 402G in the line 402C feeds the amplifier 402E and a variable resistor 402H in the line 402D feeds the amplifier 402F.

A cellular interface unit (CIU) 402I is fed by the amplifier 402E and feeds the variable resistor 402H. The CIU 402I is also coupled to the radiotelephone 301C via a handset jack line 701A connected to the radiotelephone handset jack. The CIU 402I also communicates with a central processing unit (CPU) 402J which controls the operations of the interface, including the operations of the DTMF transmitter/receiver 402K and multi-frequency (MF) transmitter/receiver 402L. Lines 402M and 402N and lines 402O and 402P connect the transmitter/receivers 402K and 402L to the tap lines 402C and 402D, respectively.

The CPU 402J is also connected to a call progress tone detector (CPTD) 402Q and supervision E&M unit 402R. The latter unit receives the E and M lines 401A, 401B and the signal ground and signal battery lines 401G, 401H.

A ground line 701B provides ground to the interface and a power line 701C provides +12 VDC power. Lines 701D and 701E from the CPU 402J provide an in use signal and a no services signal indication for the interface. Line 701F provides a line for connecting the CIU 402I to the radio-telephone handset, while lines 701G and 701H provide ground and +12 VDC power to the radiotelephone from the interface.

As above-indicated, the interfaces 400 and 800 interface the radiotelephones 301C and 301D to the trunk circuits 501 and 502 serving the telephone switching system 500. While only the two interfaces 400 and 800 have been shown, it is evident that other like interfaces can be used to interface other trunk circuits serving the switching system 500 to other radiotelephones in the cellular system 300.

As will be discussed in greater detail hereinbelow, in order to facilitate the use of the interfaces 400 and 800 and their radiotelephones 301C and 301D to couple calls to and from the telephone stations served by the telephone switching system 500, the cellular system 300 is provided with a routing correlator (RC) 306 and incoming and outgoing trunk circuits 307 and 308 for connecting the RC 306 to the MTSO 304. The RC 306 contains tables which correlate the routing numbers RN of the radiotelephones 301C and 301D with the routing numbers RN of the telephone stations served by the switching system 500. Using these tables, the RC 306, in cooperation with the MTSO 304, correlates an incoming one of the latter routing numbers with an idle one of the radiotelephones 301C and 301D and, hence, their respective interfaces 400, 800 and trunk circuits 501, 502. Accordingly, an incoming call can be routed by the MTSO through these elements to the telephone switching system 500 and from there to the appropriate called telephone station.

Similarly, for outgoing calls which are to pass through an idle one of the direct access trunks 400, 800, the telephone switching system 500 is adapted to recognize such calls by translating the dialed routing number.

A more detailed explanation will now be given of the operation of the system 100 for calls incoming to and outgoing from an idle one of the interfaces 400, 800. FIGS. 1-5 show call progress for the incoming call and FIGS. 6-9 for the outgoing call.

In the present example, it is assumed that for both the incoming and outgoing calls, the call is between the station 201A (routing number 222-1234) of the switching network 200 and the station 601A (routing number 999-1001) of the telephone switching system 500. Call progress will of course be similar for calls between each of the other telephone stations of the network 200 and the stations of the switch 500 as well as between each of the radiotelephones of the system 300 and the stations of the switch 500.

Looking first at an incoming call (FIGS. 1–5), the call originates at the calling telephone station 201A by the subscriber dialing the routing number 999-1001 of the called telephone station 601A. The dialed routing number is received by the PSTN 200 which recognizes that the call is to be processed by cellular system 300.

The PSTN 200 then sends the call and routing number to the RC 306 directly over a trunk circuit 305A or via the MTSO 304 using trunk circuits 305 and 307. Either routing method can be used and the method selected in any particular system will depend on cost factors derived based on the number of subscribers subscribing to the direct access service.

If the call is routed via the MTSO 304, the MTSO 304 will pass the call and routing number to the RC 306 over trunk 307 using a signaling method consistent with the trunk type. As can also be appreciated, the function of the RC 306 could also be performed by the MTSO 304, by appropriate adaptation or additions to the control software or programming of the MTSO.

Figure 2:
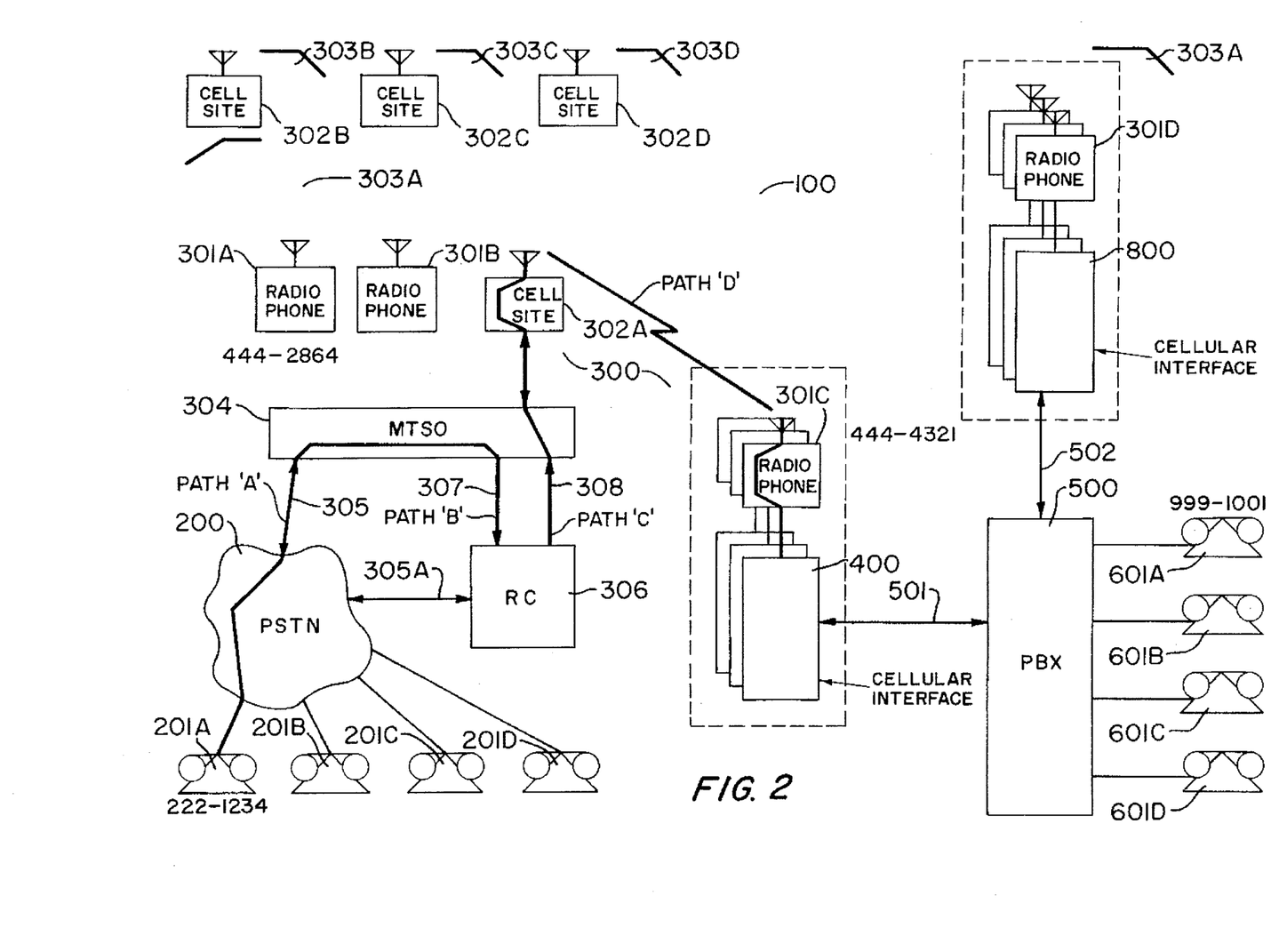

In the present case, it is assumed that the call is routed to the RC 306 through the MTSO 304 and trunks 305 and 307 as shown by paths A and B in FIG. 2. Upon receipt by the RC 306 of the call and associated routing number, the RC 306 searches its tables to correlate the received routing number to the routing numbers of idle ones of the radiotelephones 301C and 301D. Since a correlation would result for both radiotelephones due to both being interfaced with a trunk circuit serving the switch 500, its assumed that the correlation with the routing number of the radiotelephone 301C occurs first and that the RC 306 identifies the routing number 444-4321 of the radiotelephone 301C.

The RC 306 then seizes the idle outgoing trunk 308 (path C) to the MTSO 304 and, using a signaling method consistent with the outgoing trunk type, forwards the radiotelephone 301C routing number 444-4321 to the MTSO 304. Based on the forwarded routing number, the MTSO then pages the corresponding radiotelephone 301C via base station 302A over path D (see FIG. 2) for attempted connection to the radiotelephone 301C.

Figure 3:
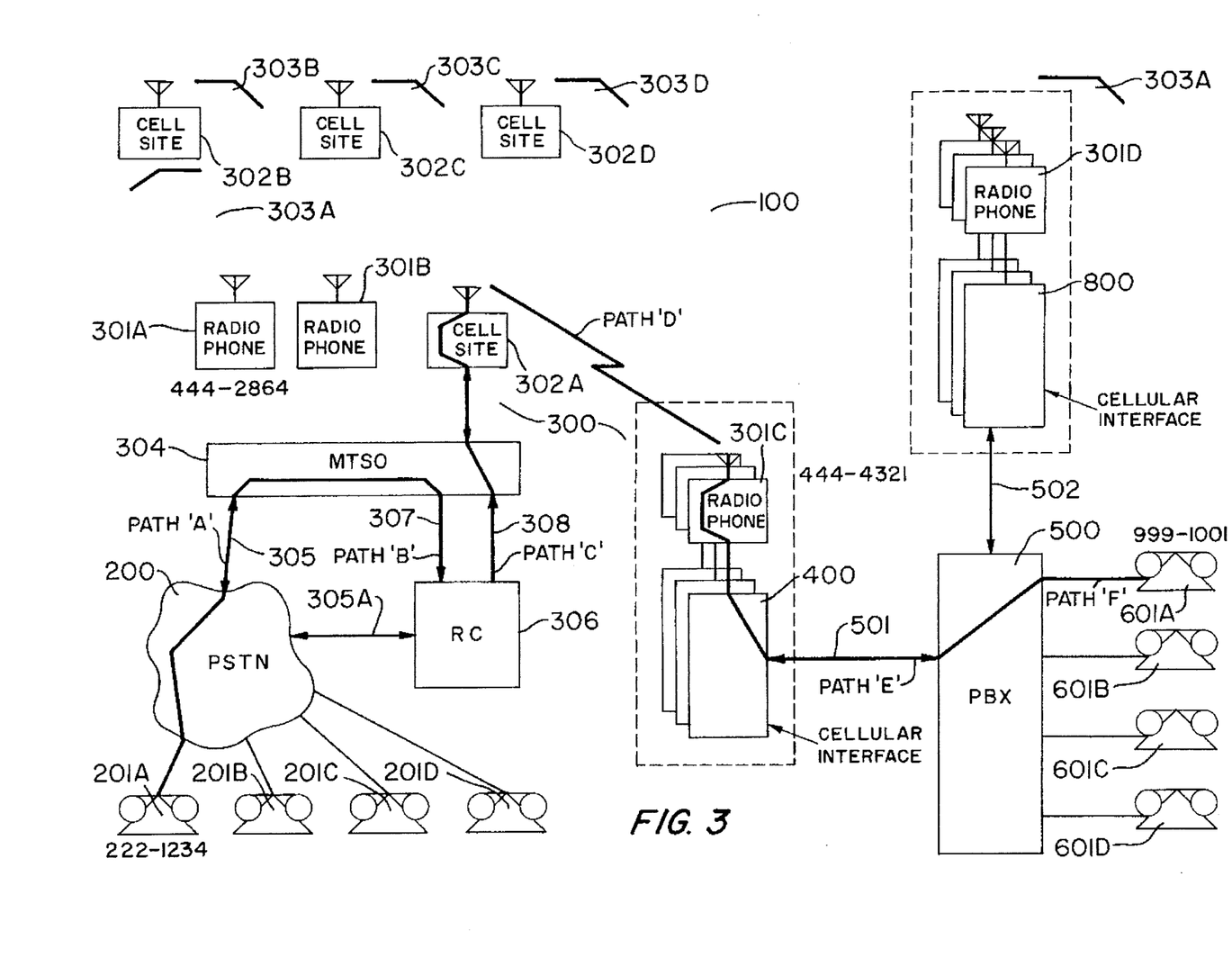

As a result of this connection attempt, an alert message is received at the control interface of the radiotelephone 301C. This alert message is fed to and detected by the interface 400 via its handset jack line 701A, CIU 402I and CPU 402J. The interface 400, via these elements, responds to the alert message by sending an answer message back to the radiotelephone 301C. This causes the call to be completed between the RC 306 and the interface 400 over the paths C and D, as shown in FIG. 3. As part of this call completion, answer supervision is returned to the RC 306 by the MTSO 304 over the seized trunk 308.

The interface 400, via the CPU 402I, then energizes the one of its tone transmitter/receivers (402K or 402L) compatible with the tone transmitter/receiver in the RC 306 to be used to communicate with the interface. This causes the transmitter/receiver of the interface to be connected to the call via a receive path defined by line 701A, CIU 402J, variable resistor 402H and amplifier 402F. The interface 400, via the CPU 402J, also addresses the supervision circuit 402R, causing it to provide the necessary supervision for seizing the trunk circuit 501.

After the RC 306 detects answer supervision over paths C and D as above-described, a tone transmitter/receiver (e.g., a MF transmitter/receiver) located at the RC 306 is attached to the outgoing seized trunk 308. The RC 306 then computes a checksum digit from the called routing number 999-1001. The routing number plus the checksum digit are then transmitted to the interface 400.

Following receipt by the interface 400 of the routing number and checksum digit, a checksum digit is computed by the CPU 402J from the received routing number and compared with the received checksum digit. If the checksum digits match, the CPU 402J causes an OK (1) digit to be sent over its transmit path, i.e., transmitter/receiver (402k or 402L), variable resistor 402G, amplifier 402E, CIU 402I and line 701A, through radiotelephone 301C and over the call paths C, D to the RC 306.

The CPU 402J then causes the one of its transmitter/receivers (402K or 402L) compatible with the signaling of the trunk circuit 501 (e.g., MF-R1, MF-R2, DTMF, DP) to be attached to the tap line 402D. Via this transmitter/ receiver, tap line 402D, transformer 402B and two-wire line 401E, 401F, the routing number is sent over the trunk circuit 501 (path E, see FIG. 3) and received by the switch 500.

After the switch 500 has received and verified the routing number 999-1001 as being served by the switch, and if telephone station 601A having the routing number is idle, a ringing signal is sent by the switch to the station 601A via the line circuit connecting the switch to the station (path F, see FIG. 3). When the telephone station 601A is answered, answer supervision is returned to the switch 500 by the telephone station over the line circuit by the telephone station going off-hook. The switch then returns answer supervision over the trunk circuit E&M leads which are connected to the E&M leads 401A, 401B of the interface 400. The interface 400, in turn, generates an answer supervision backward signal via its appropriate transmitter/receiver and transmit path to the radiotelephone 301C which, in turn, conveys the signal backward so it travels over paths C and D and is received at the RC 306.

Figure 4:
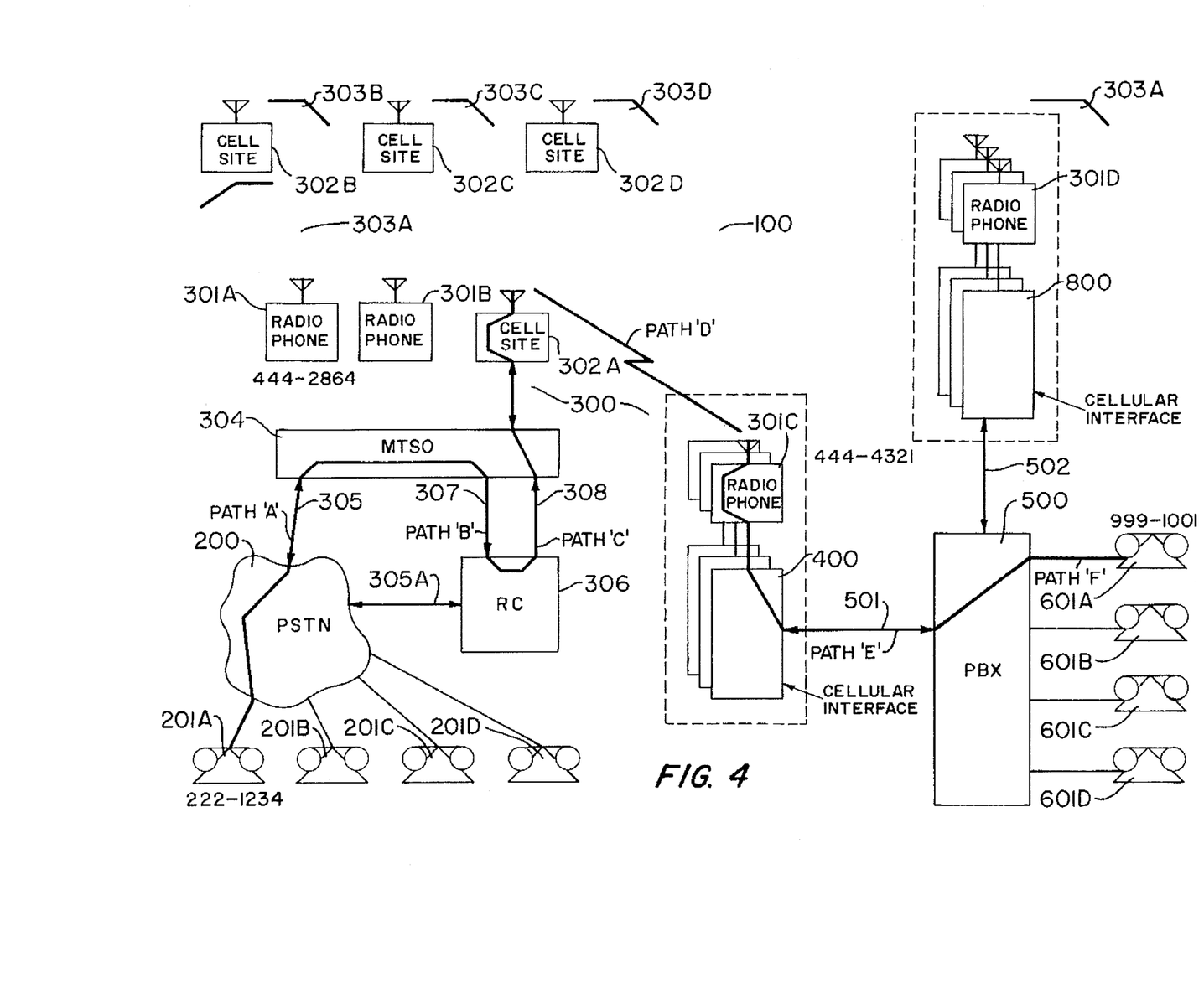

After the RC 306 receives answer supervision over paths C and D, it releases its tone transmitter/receiver and connects path B to path C and returns answer supervision back to the MTSO 304 over the connecting trunk 308, or the PSTN 200 over the trunk 305A. The call from the telephone station 201A to the telephone station 601A is thus completed over paths A, B, C, D, E and F, as shown in FIG. 4. If either the calling station 201A or the called station 601A hangs up, all paths of the call are released by the respective switches and the call is terminated.

If the CPU 402J of the interface 400, in comparing the computed checksum digit with the received checksum digit, determines that there is a mismatch, or if other errors develop before or during transmission of the routing number digits from the RC 306 to the interface 400, the CPU 402J causes a resend signal tone to be sent over its transmit path to the radiotelephone 301C. In the present illustrative case, this signal tone is represented by the digit (0) compatible with the signaling of the trunk circuit. Of course, the signal tone could also have been represented by other digits as well.

The signal tone is then sent by the radiotelephone over the paths C and D to the auxiliary switch 306 which resends the digit. After three re-send requests, the CPU 402J causes an abort digit (7) to be sent to the radiotelephone 301C which sends it on to the RC 306 and the trunk circuit 501 is released. In addition, if the interface CPU 402J detects any of the following call progress tones via CPTD 402Q, the corresponding digit is returned to the radiotelephone and via the latter to the RC 306 and the trunk 501 is released:

| Equipment Busy | digit (2) |
| Intercept Tone | digit (3) |
| Busy Tone | digit (4) |

Having described incoming call progress for a call between telephone stations 201A and 601A, outgoing call progress illustrated in FIGS. 5–10 will now be described. In this case, call origination is at the telephone station 601A.

Figure 5:
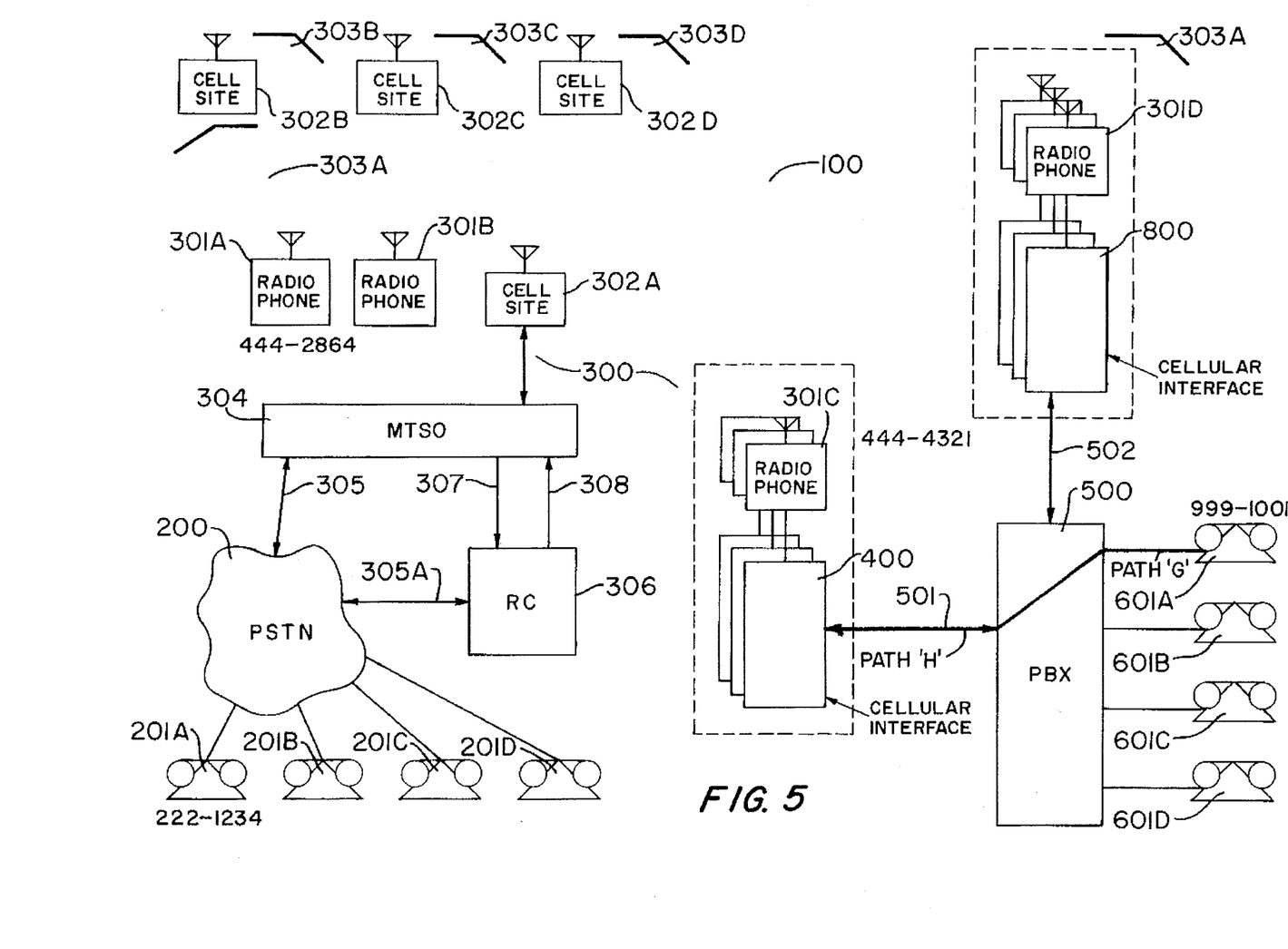
FIGS. 5–9 show various stages of outgoing call progress in the telephone system of FIGS. 1–4.

A call to telephone station 201A is originated at telephone station 601A by a subscriber dialing the routing number of station 201A, i.e., 222-1234. A path G, as shown in FIG. 5, is thereby established via the line circuit connecting the station 601A to the switching system 500. The switching system 500 recognizes from the routing number that a call is to be placed via a trunk circuit having direct access to the cellular system 300. The switching system 500 then selects an idle trunk circuit having such access.

In the present case, the switching system 500 selects the idle trunk circuit 501 and the trunk circuit and its associated interface 400 are seized by an appropriate supervision change over the E&M lines of the trunk circuit and interface. This establishes the communication path H, as is also shown in FIG. 5. The CPU 402J of the interface 400 thereupon causes the appropriate transmitter/receiver (402K or 402L) to be connected to the tap line 402C feeding the transformer 402A for receipt of tones over the two-wire path 401C, 401D. The switch 500 then transmits the digits of the routing number 222-1234 to the interface with tone signaling compatible with the trunk circuit 501 and the connected tone transmitter/receiver of the interface.

Figure 6:
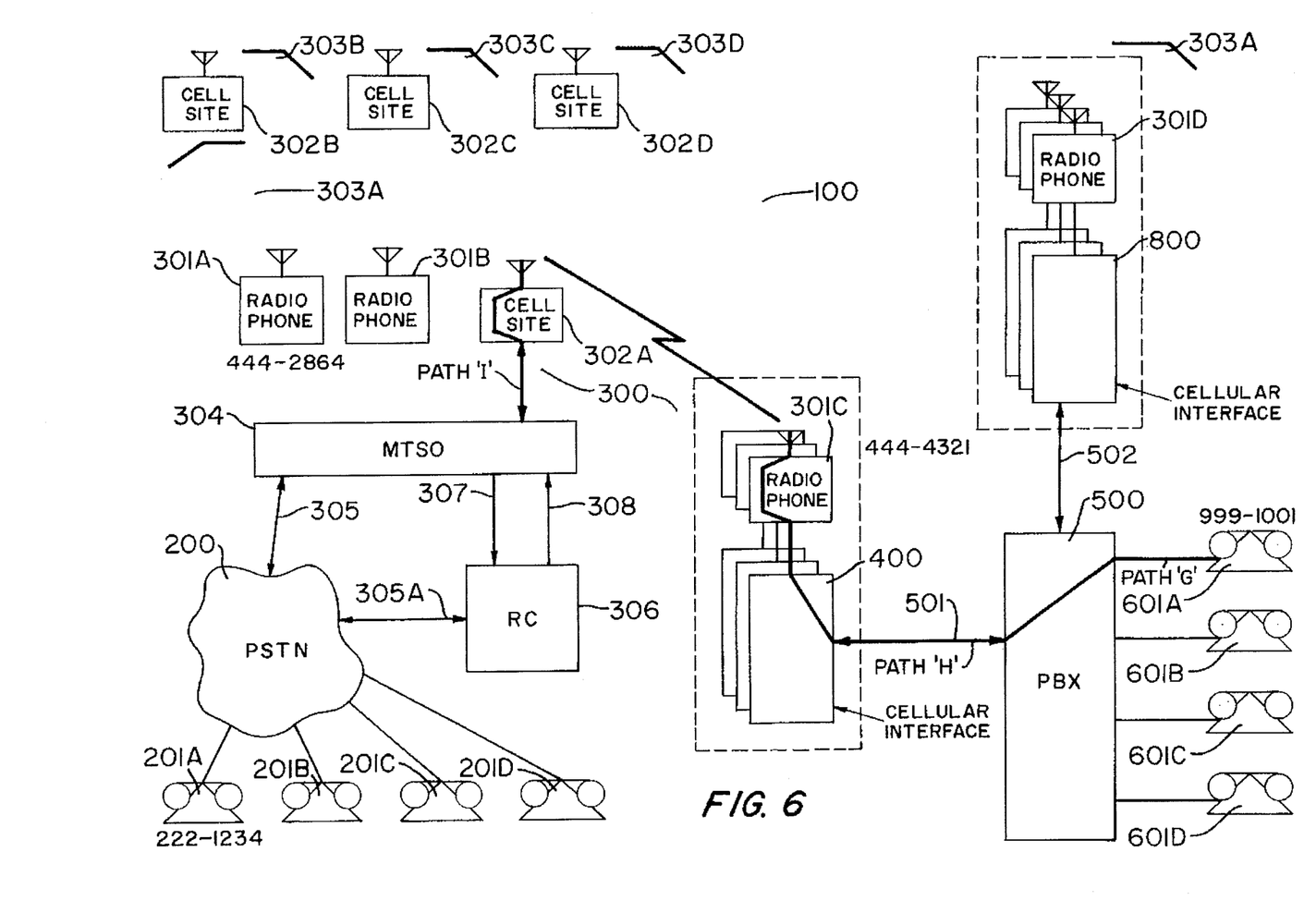
Figure 7:
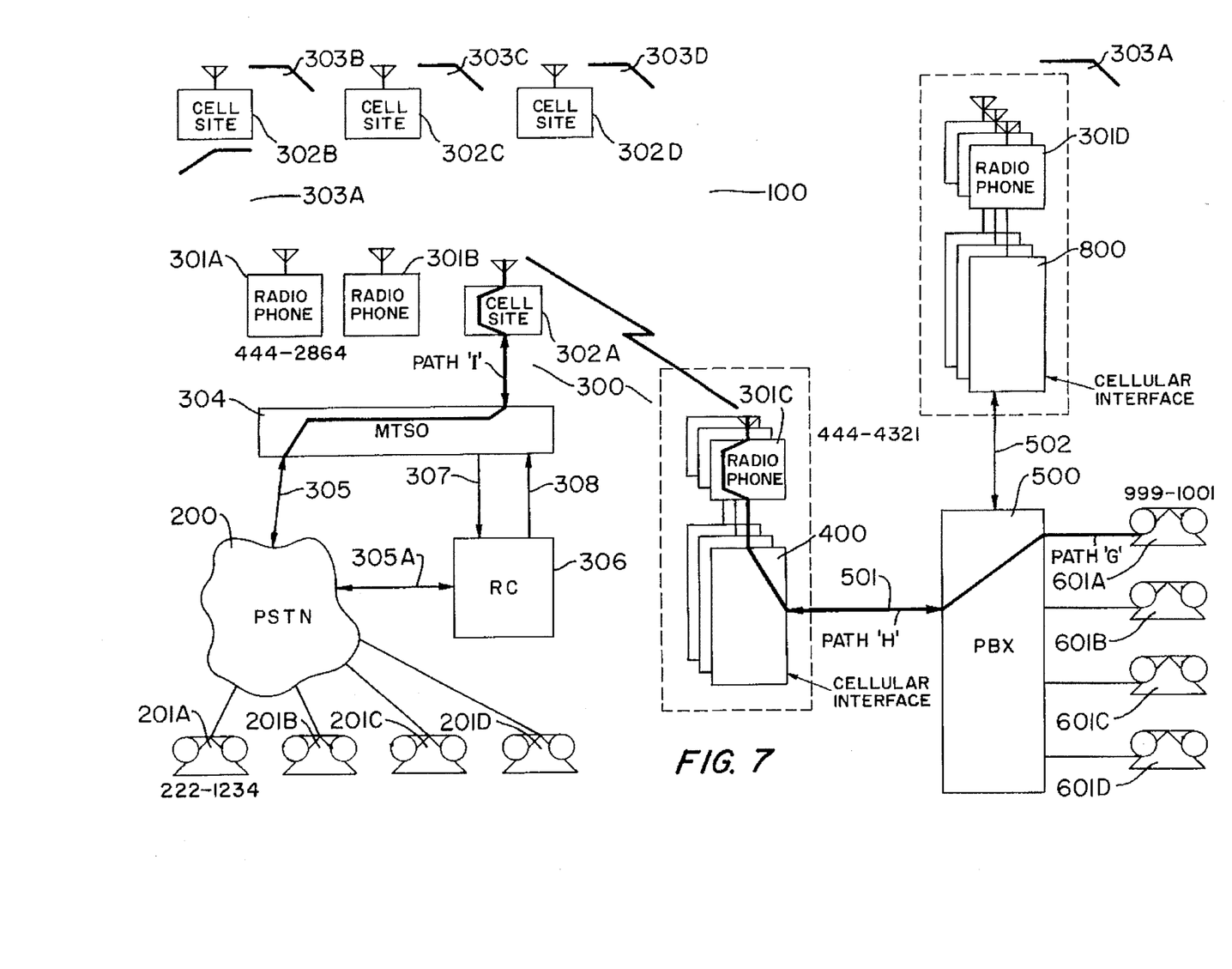

The interface 400 then sends, via the CPU 402J and CIU 402I, a call origination signal and the routing number 222-1234 to the radiotelephone 301C. The radiotelephone 301C responds by originating a cellular call to its associated base station 302A which, in turn, establishes a call connection to the MTSO 304. The cellular call path I is thereby established as shown in FIGS. 6 and 7 and the call and routing number digits are transmitted to the MTSO 304.

The MTSO 304 recognizes from the routing number that the call is to a telephone station on the PSTN 200. The MTSO then provides a call connection over the trunk circuit 305 (path L) to the network 200 as shown in FIG. 8. The network 200 then provides a call connection to the telephone station 201A based upon the called routing number 222-1234. The call from the station 601A to the station 201A is thus completed over paths G, H, I, L and M as shown in FIG. 9. The call continues until either phone 201A or phone 601A hangs up in which case all call connections terminate and all equipment returns to its idle state.

As used herein the following terms have the following meanings:

a) Integrated Services Digital Network (ISDN) means an integrated digital network in which the same digital switches and digital paths are used to establish connection for different services, for example, telephone, data;

b) Common Channel Signaling (CCS) means a signaling method in which a single channel conveys, by means of labeled messages, signaling information relating to many circuit or calls and other information, such as that used for network management;

c) Signaling System 7 (SS7) means an internationally standardized, general-purpose CCS system; and d) out-of-band signaling means a method of signaling that uses the same path as voice-frequency transmission, but in which the signaling band is outside the band used for voice frequencies.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention. For example, while specific seven digit routing numbers have been used in the illustrative embodiment, it is apparent that out types of routing numbers of more or less digits could be used depending upon the telephone number plan in current use.

What is claimed is:

1. A telephone system comprising:

a radiotelephone communications system including: one or more radiotelephones; one or more base stations for radio communicating with one or more of said radiotelephones; a radiotelephone switching office for selectively connecting calls between radiotelephones via said base stations;

a further system including: one or more first telephone stations; a telephone switching system for coupling calls to and from said one or more first telephone stations; a telephone trunk circuit used with said telephone switching system, said telephone trunk circuit for connecting to an interoffice telecommunications facility, said telephone trunk circuit utilizing supervision for effecting call origination and/or termination and signalling for effecting transfer of call routing information;

an interface circuit for interfacing a first of said radiotelephones with said telephone trunk circuit so that calls are routed between said radiotelephone communication system and said first telephone stations of said further system through said telephone switching system comprising: first means adapted to interact with said supervision for interfacing said supervision with said first radiotelephone for effecting a call origination and/or termination; and second means adapted to interact with said signalling for interfacing said signalling with said first radiotelephone for effecting transfer of call routing information;

said further system further including: a public switched telephone network; one or more second telephone stations connected to said public switched telephone network; said public switched telephone network being coupled to said radiotelephone switching office so that calls are coupled between a second telephone station and a radiotelephone served by the radiotelephone communications system or between a second telephone station and said first telephone station served by the radiotelephone communications system via said first of said radiotelephones; and said radiotelephone communications system further comprising: routing correlator (RC) means having a correlation table for correlating the routing numbers of said first telephone stations with the routing number of said first radiotelephone interfaced by said interface circuit; and said radiotelephone switching office and said RC cooperating such that calls from said second telephone stations routed to said radiotelephone switching office are routed by said radiotelephone switching office to said RC to determine from said correlation table whether the routed call is to a routing number of a first telephone station correlated to said interfaced first radiotelephone and if so routing said call to said interfaced radiotelephone and transmitting said routing number to said interfaced radiotelephone and said interface.

2. A telephone system in accordance with claim 1 wherein:

said supervision for call origination and/or termination comprises one or more of: E&M signaling; loop reverse battery signaling; duplex signaling; single frequency signaling; digital multiplexed signaling; labeled messages; or CCS, SS7 or ISDN messages;

and said signaling for effecting transfer of call routing information comprises one or more of: multi-frequency R1; multi-frequency R2; DTMF; dial pulse; labeled messages; or CCS, SS7 or ISDN messages.

3. A telephone system in accordance with claim 2 wherein:

said supervision includes: a state change of supervision to indicate start of routing information transfer; and a state change of supervision for answer supervision.

4. A telephone system in accordance with claim 2 wherein:

said telephone trunk circuit comprises one or more of: a two-wire telephone trunk circuit; a four-wire telephone trunk circuit; a labeled message based telephone trunk circuit; or a CCS, SS7 or ISDN telephone trunk circuit.

5. A telephone system in accordance with claim 1 wherein:

said telephone switching system comprises one or more of: a PBX, a private or public central office, a private or public access tandem switch or a radiotelephone switching office.

6. A method of operating a telephone system comprising:

providing a radiotelephone communications system including: one or more radiotelephones; one or more base stations for radio communicating with one or more of said radiotelephones; a radiotelephone switching office for selectively connecting calls between radiotelephones via said base stations;

providing a further system including: one or more first telephone stations; a telephone switching system for coupling calls to and from said one or more first telephone stations; a telephone trunk circuit used with said telephone switching system, said telephone trunk circuit for connecting to an interoffice telecommunications facility, said telephone trunk circuit utilizing supervision for effecting call origination and/or termination and signalling for effecting transfer of call routing information;

interfacing a first of said radiotelephones with said telephone trunk circuit so that calls are routed between said radiotelephone communication system and said first telephone stations of said further system through said telephone switching system comprising: first means adapted to interact with said supervision for interfacing said supervision with said first radiotelephone for effecting a call origination and/or termination; and second means adapted to interact with said signalling for interfacing said signalling with said first radiotelephone for effecting transfer of call routing information;

said further system further including: a public switched telephone network; one or more second telephone stations connected to said public switched telephone network; said public switched telephone network being coupled to said radiotelephone switching office so that calls are coupled between a second telephone station and a radiotelephone served by the radiotelephone communications system or between a second telephone station and said first telephone station served by the radiotelephone communications system via said first of said radiotelephones; and said radiotelephone communications system further comprising: routing correlator (RC) means having a correlation table for correlating the routing numbers of said first telephone stations with the routing number of said first radiotelephone interfaced by said interface circuit; and said radiotelephone switching office and said RC cooperating such that calls from said second telephone stations routed to said radiotelephone switching office are routed by said radiotelephone switching office to said RC to determine from said correlation table whether the routed call is to a routing number of a first telephone station correlated to said interfaced first radiotelephone and if so routing said call to said interfaced radiotelephone and transmitting said routing number to said interfaced radiotelephone and said interface.

7. A method in accordance with claim 6 wherein:

said supervision for call origination and/or termination comprises one or more of: E&M signaling; loop reverse battery signaling; duplex signaling; single frequency signaling; digital multiplexed signaling; labeled messages; or CCS, SS7 or ISDN messages;

and said signaling for effecting transfer of call routing information comprises one or more of: multi-frequency R1; multi-frequency R2; DTMF; dial pulse; labeled messages; or CCS, SS7 or ISDN messages.

8. A method in accordance with claim 7 wherein:

said supervision includes: a state change of supervision to indicate start of routing information transfer; and a state change of supervision for answer supervision.

9. A method in accordance with claim 7 wherein:

said telephone trunk circuit comprises one or more of: a two-wire telephone trunk circuit; a four-wire telephone trunk circuit; a labeled message based telephone trunk circuit; or a CCS, SS7 or ISDN telephone trunk circuit.

10. A method in accordance with claim 6 wherein:

said telephone switching system comprises one or more of a: PBX, a private or public central office, a private or public access tandem switch or a radiotelephone switching office.

* * * * *